April 5, 1927.

E. T. BELLMAN 1,623,571

CIRCUIT CLOSING DEVICE

Filed July 6, 1925

Inventor
Edward T. Bellman

Witness
T. P. Britt

Patented Apr. 5, 1927.

1,623,571

UNITED STATES PATENT OFFICE.

EDWARD T. BELLMAN, OF ROCKFORD, ILLINOIS, ASSIGNOR OF ONE-THIRD TO JAMES J. RANEY, OF ROCKFORD, ILLINOIS.

CIRCUIT-CLOSING DEVICE.

Application filed July 6, 1925. Serial No. 41,751.

This invention relates to vehicle burglar alarm systems.

Objects of this invention are to provide a burglar alarm system for a vehicle which is so constructed that an alarm will be given when the hood or any of the doors are opened, whenever the automobile occupies a different position with reference to a horizontal line from that in which it was left, and when an attempt is made to remove the rear tire.

Further objects are to provide an alarm system for an automobile which may be readily hidden, which is of simple construction, and which is extremely effective in operation.

An embodiment of the invention is shown in the accompanying drawings, in which:—

Figure 1:
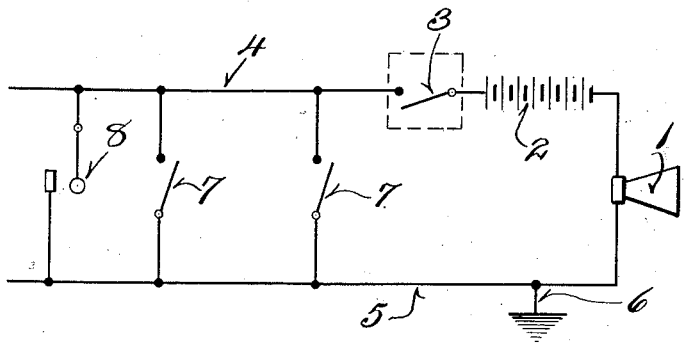
Figure 1 is a diagrammatic view showing the system.
Figure 2:
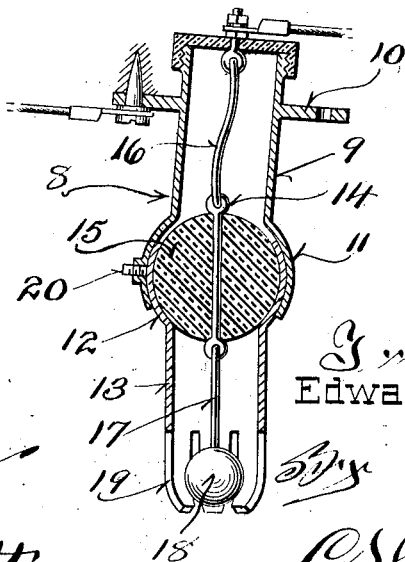
Figure 2 is a view of a part of the device responsive to changes in position of the machine.

Referring to the drawings, it will be seen that the alarm system is provided with a horn 1 or other suitable device of this general nature. Obviously, lights may be employed in addition to the horn, if desired, and other sounding means may be substituted for the horn. Preferably, this horn is hidden.

A battery 2 is employed for energizing the horn or signal device and this battery preferably comprises a separate and hidden battery distinct from the main battery of the machine, although it is understood the main battery could be used. The battery has one end connected with the signal device and the other end connected through a key controlled switch 3 with one of the mains 4, such main being hereinafter referred to as the live main. The other side of the signal devices is connected with the main 5 which is ground, as indicated at 6.

A plurality of switches 7 are illustrated in the drawings, and it is intended that these switches be placed on each of the several doors, and on the hood and luggage carrier flap or compartment flap of the machine. It is not thought necessary to detail these switches as any suitable type of switch may be employed which is closed when the door or similar member is opened. These switches are of well known construction.

A position responsive device is indicated generally at 8 in Figure 1, and is shown in greater detail in Figure 3. This device comprises a tubular casing 9 equipped with flanges 10 secured to any suitable and hidden portion of the machine. This tubular portion is provided with a spherical end 11 which receives a correspondingly shaped spherical end 12 of a movable tubular extension 13. An insulating sphere 15 is positioned within these spherical members and carries a conducting link 14. This link has its upper end connected by means of the flexible conductor 16 with the main 4. The members 13 and 9 are metallic and are connected with the grounded conductor 5, as illustrated diagrammatically in Figure 1. The lower end of the link 14 carries a metallic rod 17 or flexible conductor whose lower end is attached to a sphere or weight 18. It is to be noted that the lower end of the member 13 is provided with inwardly turned prongs 19 which partially enclose the ball 18 but are spaced therefrom under normal conditions.

In using the device 8, the operator sets the member 13 at the desired angle corresponding to the tilt of the car and thus keeps the member 13 out of contact with the ball 18. If desired a set screw 20 may be employed for locking the parts in their adjusted position. If the car is disturbed under these conditions and is driven away obviously it will occupy a different angular position with reference to a horizontal line. In fact, the act of stepping upon the running board is sufficient to cause contact between the ball 18 and the member 13. This tilting of the car, therefore, instantly gives the alarm.

It will be seen that a vehicle burglar alarm system has been provided which is of simple construction, in which the parts may be very readily concealed and which is highly effective, such system giving an alarm when any door, flap or hood is opened, when the car is tilted or when an attempt is made to remove the spare tire.

Although the invention has been described in considerable detail, it is to be understood that the invention may be variously embodied and is, therefore, to be limited only as claimed.

I claim:

A circuit closer for a vehicle alarm system comprising a tubular body portion adapted for attachment to the vehicle body, a second tubular member having a universal connection with said first tubular member and being frictionally retained in any relative adjusted position with respect to said first mentioned member, said second mentioned tubular member being metallic, an insulator carried by said second member and having a conductor extending therethrough, an elongated metallic member pivotally carried by said conductor and adapted to swing with reference thereto, and a metallic weight carried at the end of said elongated metallic member and adapted to contact with said second mentioned tubular member when the entire device is displaced.

In testimony that I claim the foregoing I have hereunto set my hand at Milwaukee, in the county of Milwaukee and State of Wisconsin.

EDWARD T. BELLMAN.